United States Patent [19]

Hays, Jr. et al.

[11] 4,354,227

[45] Oct. 12, 1982

[54] FIXED RESOURCE ALLOCATION METHOD AND APPARATUS FOR MULTIPROCESSOR SYSTEMS HAVING COMPLEMENTARILY PHASED CYCLES

[75] Inventors: Daniel O. Hays, Jr.; Andrew W. Maholick, both of Raleigh; William N. Mize, Cary, all of N.C.

[73] Assignee: International Business Machines Corp., Armonk, N.Y.

[21] Appl. No.: 95,840

[22] Filed: Nov. 19, 1979

[51] Int. Cl.³ .......................... G06F 9/46; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,435,418 | 3/1969 | Evans et al. | 364/200 |
| 3,469,239 | 9/1969 | Richmond et al. | 364/200 |
| 3,528,061 | 9/1970 | Zurcher, Jr. | 364/200 |
| 3,566,358 | 2/1971 | Hasbrouck | 364/200 |
| 3,676,860 | 7/1972 | Collier et al. | 364/200 |
| 3,706,077 | 12/1972 | Mori et al. | 364/200 |
| 3,774,157 | 11/1973 | Tsui | 364/200 |
| 3,886,525 | 5/1975 | Brown et al. | 364/200 |
| 3,997,896 | 12/1976 | Cassarino, Jr. et al. | 364/200 |
| 4,048,623 | 9/1977 | Gruner | 364/200 |
| 4,050,059 | 9/1977 | Williams et al. | 364/200 |
| 4,073,005 | 2/1978 | Parkin | 364/200 |
| 4,096,571 | 6/1978 | Vander Mey | 364/200 |
| 4,164,787 | 8/1979 | Aranguren | 364/200 |

OTHER PUBLICATIONS

IBM TDB, vol. 7, No. 8, Jan. 1965, pp. 671-675.
IBM TDB, vol. 20, No. 11B, Apr. 1978, pp. 5068, 5070, Bantz et al.
IEEE Transactions on Electronic Computers, vol. EC-16, No. 3, Jun. 1967, pp. 320-326.

*Primary Examiner*—Gareth D. Shaw
*Assistant Examiner*—Eddie P. Chan
*Attorney, Agent, or Firm*—Edward H. Duffield

[57] ABSTRACT

In multiprocessor data processing systems that utilize individual processors having interlaced cycles of operation controlled by complementarily phased clocks, contention for fixed resources such as memory, I/O, or data storage for example, may result unless an interlock method allocating the use of the fixed resource to one or another of the interlaced cycle processors is included. The usual test and set instruction approach for allocating fixed resources will not effectively interlock the use of fixed resources in a multiprocessor system having interlaced cycles without potential contention arising. The present invention resolves this difficulty by providing means for identifying which processor currently has been allocated control of a given fixed resource. In particular, in order to resolve the possible state of contention between processors accessing a common storage area which indicates the present allocation of the common fixed shared resource, the invention includes a test and set interlock instruction that is described to resolve the problem. Thus, potential contention between processors for access to the allocating means is resolved and the allocating means itself resolves potential contention for the fixed shared resource.

2 Claims, 5 Drawing Figures

FIXED RESOURCE ALLOCATION METHOD AND APPARATUS FOR MULTIPROCESSOR SYSTEMS HAVING COMPLEMENTARILY PHASED CYCLES

FIELD OF THE INVENTION

This invention relates generally to data processing systems and computers in which multiple processors may operate simultaneously on complementary cycles of a clock. More specifically it relates to multiprocessor data processing systems in which common fixed resources must be shared between the processors at various times. It also relates to interlock or contention resolution means for allocating the usage of these fixed shared resources in such a system.

PRIOR ART

In systems utilizing processors having complementarily phased cycles, the usual test and set instruction approach for allocating fixed commonly shared resources will not effectively interlock the use of these resources without potential contention occurring between processors for the usage of the fixed resource. Interactive systems having tie breaking means and methods for granting access are known. See for example, U.S. Pat. No. 3,676,860 assigned to the Assignee of the present invention which, while it may break ties in an interactive processor contention situation, does not effectively interlock usage of a fixed resource to a given processor after a tie has been resolved.

General interlock control apparatus also exists as shown for example in U.S. Pat. Nos. 3,566,358 or 3,435,418, the latter of which is assigned to the Assignee of the present invention. However, these deal with interlocks for determining when a given processor or program within any single processor may access a given record which may be in use by another processor or program and thus not be available for the current requesting entity; these do not resolve contention between processors seeking usage of a shared fixed common resource which may be otherwise available.

Also related is the typical compare and swap routine such as shown in U.S. Pat. No. 3,886,525 assigned to the Assignee of the present invention in which contents of various registers are compared as a key to controlling swapping of various register or memory contents at specific locations.

It is apparent that none of the foregoing prior art patents or teachings address the issue of resolving contention for a fixed shared resource in a multiprocessor system with complementarily phased clocks in a manner which will also interlock the usage of that resource with a given processor for the duration of its use.

OBJECTS OF THE INVENTION

In light of the above enumerated difficulties with the known prior art apparatus and methods for resource allocation and control, it is an object of the present invention to provide an improved method and apparatus for controlling allocation of an interlocking usage of fixed shared resources in such a complementarily phased multiprocessor system while also providing improved techniques and apparatus for resolving contention between processors for access to the allocation means without requiring an arbiter circuit or apparatus for giving access to the allocation means.

SUMMARY

The foregoing and still other unenumerated objects of the present invention are met by providing a means and method for identifying the specific processor in a multi-processor system having complementarily phased clocks, which currently has control of a given fixed shared resource. Then, since in multiprocessor systems having complementarily phased clock cycles, no processor can be guaranteed sole access to a common storage location utilized for controlling access to the common shared resource (because the first phase of the clock cycle grants access to a first processor while the second phase of the same clock cycle may grant access to another processor before the first processor can "lock up" the resource on the next first phase of the ensuing clock cycle), an interlock method for controlling access to the allocation means is provided. The method used requires the processor to test for availability of the resource and, if available, to write its ID in an access granting register and then check on the next clock cycle to see that its own ID is still present and has not been changed by a later accessing processor. The difficulty arises in complementarily phased clock cycle driven processor systems having more than one processor because a first processor, upon testing for availability of a resource must wait until its next clock cycle phase of the appropriate type before it can write its identification code into a register to reserve the use of a resource. In the interim, on the alternate phase of the same clock cycle that the first processor tested for availability of the resource, a second processor can test for the availability and find the same resource available. Thus finding availability, the second processor will proceed in the next clock cycle to write its identification into the register. This will effectively overwrite what the first processor may have entered. Therefore, an additional wait cycle is instituted in the present invention to allow all these potential contenders to complete the writing process. This is followed by steps of reading the control register and comparing it against each processor's ID to determine which processor is actually authorized to take control of the resource.

The invention will be more specifically described with relation to a preferred embodiment thereof illustrated in the appended drawings in which:

DETAILED SPECIFICATION

Figure 1:
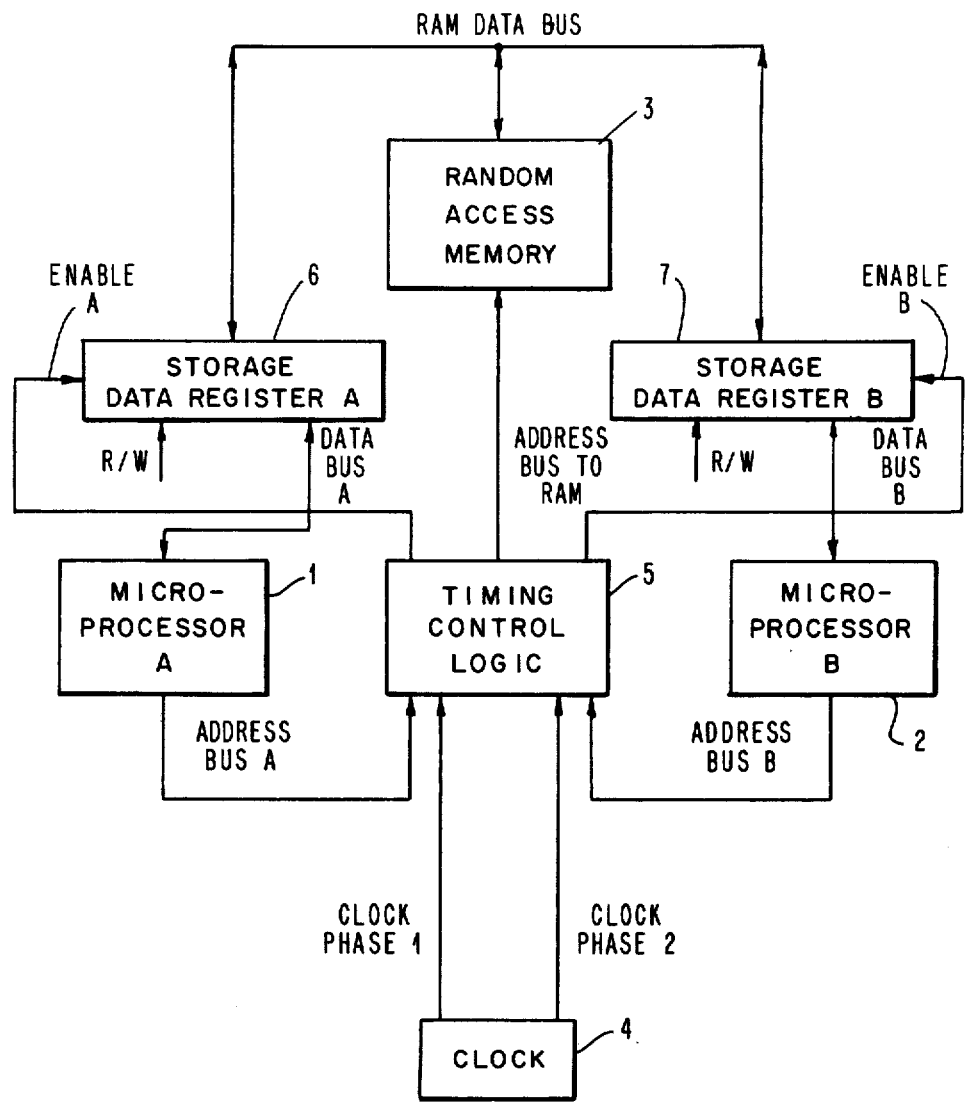
FIG. 1 illustrates a dual microprocessor system where contention for a single fixed shared resource such as an area of a random access memory, for example, is to be controlled.

Turning to FIG. 1, an overall embodiment of the invention is shown in which microprocessors 1 and 2 share, for example, a random access memory 3 operating at twice the rate of either microprocessor 1 or 2. A clock 4, which may comprise a crystal oscillator and counters as is well-known provides suitable cycle timing pulse trains. These pulses are utilized by the timing control logic element 5 employed in the present invention to control storage data registers uniquely associated with each of the microprocessors for an interlaced or complementarily phased operation of access to the random access memory 3. In the present context, "complementarily phased" is defined as follows: On a first phase of a two-phase clock signal provided by clock 4, a first microprocessor such as microprocessor 1 will present an address to the random access memory 3; on the second phase of a complementary two-phase clock signal, the microprocessor 1 will read or write data from or to the memory 3. Microprocessor 2 will present its addresses on phase 2 of the same clock signal and will read or write data from or to the memory 3 on clock phase 1. This will be described in greater detail later with reference to the timing diagrams.

Figure 5:
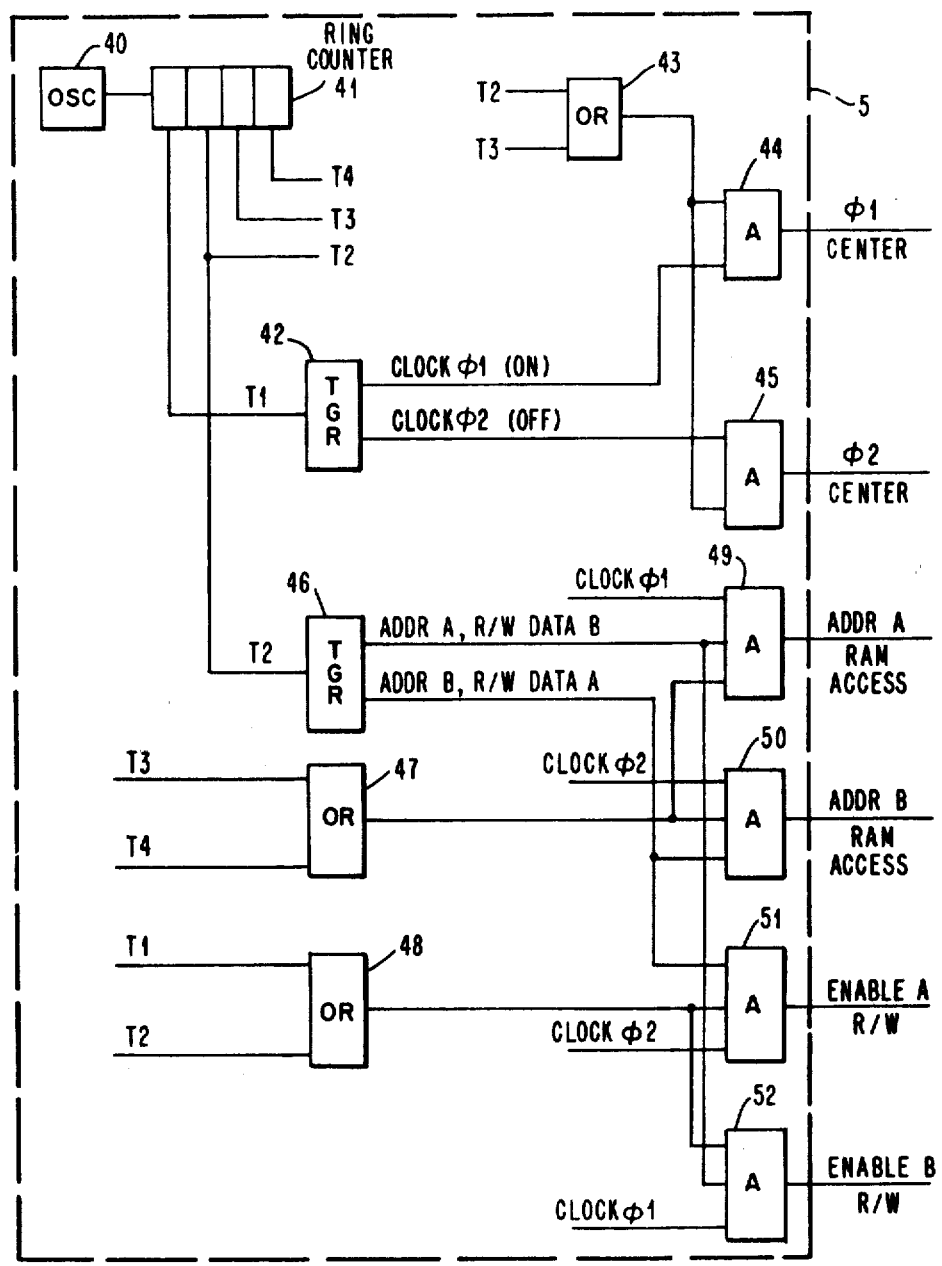
FIG. 5 illustrates in greater detail the timing control logic 5 from FIG. 1.

The timing control logic element 5 utilizes timing derived from the clock 4. Details of the clock and the timing control logic are shown in FIG. 5.

Clock 4 comprises an oscillator 40, typically a crystal controlled multi vibrator, which advances a four stage ring counter 41 for example. The timings from the outputs of the ring counter 41 are labeled T1, T2, T3 and T4.

Time T1 is used for advancing a binary trigger 42. The ON side of trigger 42 is labeled clock phase 1 and the OFF side is labeled clock phase 2.

Times T2 and T3 are logically ORed together via OR circuit 43. The output of OR circuit 43 is fed to an AND circuit 44 and to another AND circuit 45. The ON side of trigger 42 is clock phase 1 and is fed to the second input of AND circuit 44 to drive the signal indicating the center of phase 1 which is obtained at the output of AND circuit 44. The OFF side of trigger 42 is clock phase 2 which is fed to the second input of AND circuit 45 to produce the signal showing the center of phase 2 at the output of AND circuit 45.

The signal T2 is also used for advancing the binary trigger 46. The ON side of trigger 46, when active, denotes that it is time for the first microprocessor in the system to present its address and for the second microprocessor to read or write data.

When the OFF side of trigger 46 is active, it designates the time for the second microprocessor to present its address and the first microprocessor to read or write data.

Figure 2:
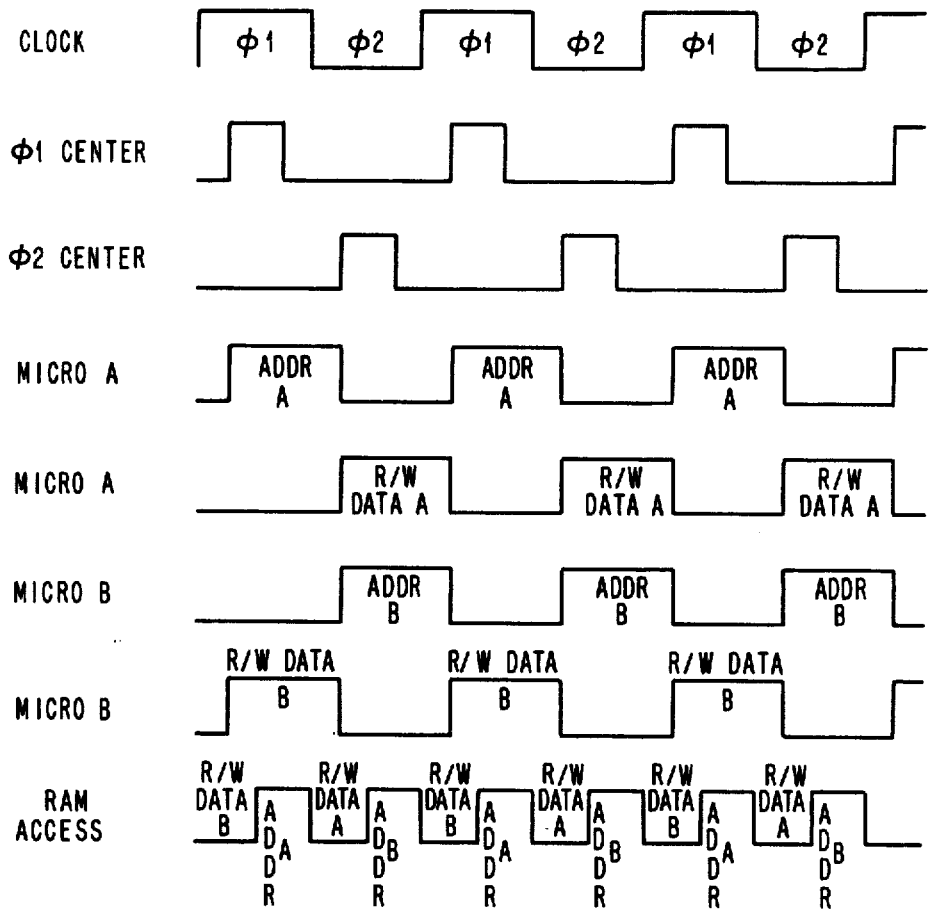
FIG. 2 illustrates a system timing diagram for a dual microprocessor system such as illustrated in FIG. 1.

Additional timing is used for sequencing the specific accesses by the microprocessors to memory as shown in FIG. 2. In FIG. 5, the two OR circuits 48 and 47 are employed to obtain the logical OR equivalent of times T1 and T2 and T3 and T4 respectively. These times are used for access to memory as shown in FIG. 2.

Four AND circuits numbered 49 through 52, respectively, are utilized for obtaining the correct time of access to memory and for reading and writing data to the memory. AND circuit 49 has as its inputs the clock phase 1, the output of OR gate 47 and the on side trigger output of trigger 46 to yield a time of address A memory access. AND circuit 50 is used in similar fashion but with clock phase 2 and the other output from trigger 46 to time the address B for the second microprocessor access to memory. Other timings are derived by AND circuits 51 and 52 for enabling microprocessor A and microprocessor B for reading and writing of data as shown.

Data read from or to be written in random access memory 3 will be temporarily retained in storage registers 6 and 7 uniquely associated with the microprocessors 1 and 2 respectively. These are called storage data registers 6 and 7 and are contained within the individual microprocessors. The microprocessors 1 and 2 are capable of executing a variety of instructions and may contain many more registers than those shown in the Figures. However, only those registers required for implementation of the present invention are illustrated in detail. The work register 22 illustrated in FIG. 3 for example may be only one of an eight-register array associated with a unique interrupt level in a given microprocessor.

Figure 3:
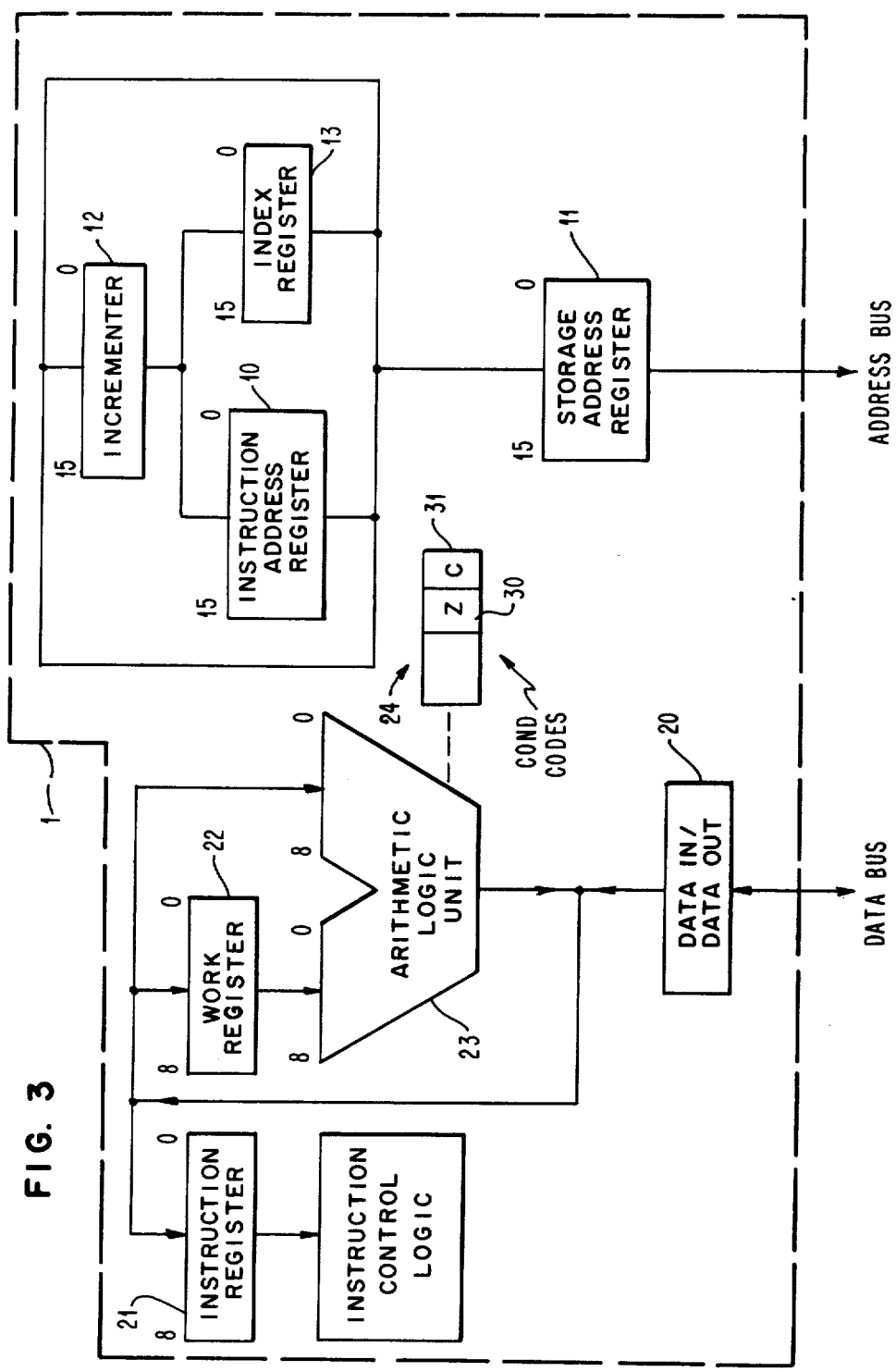
FIG. 3 schematically illustrates a microprocessor with the necessary registers and apparatus for implementing the method practiced in the preferred embodiment of the invention.
Figure 4:
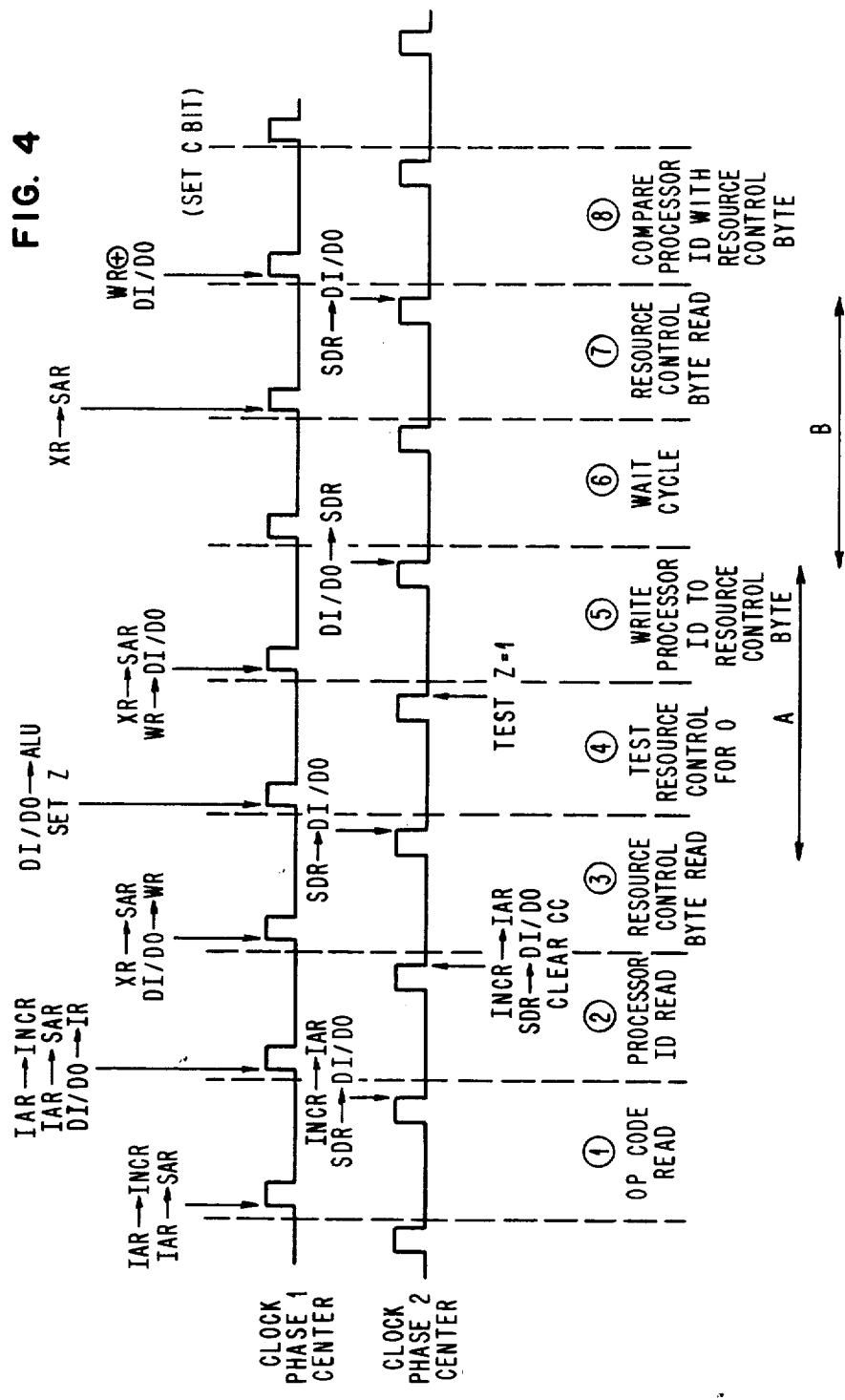
FIG. 4 illustrates the cycle timing diagram for the apparatus shown in FIG. 3.

Turning now to FIG. 4, a timing diagram for a test and set or interlock method showing what occurs at each phase of each clock cycle is given. FIG. 4 is to be used in conjunction with FIGS. 1, 2, and 3 as an aid to the subsequent description.

Turning to FIG. 3, an individual microprocessor 1 is shown in greater detail. When a microprocessor desires the exclusive use of a shared fixed resource, it must first load the desired address for the resource control byte into the index register 13. A convention is adopted whereby if a resource is available for use the contents of the storage location addressed by the index control register 13 will contain the value 0. This portion is called the resource control byte and its address is established by the program when the instruction is coded. If the resource is unavailable or is currently in use by another microprocessor, the storage location in register 13 will contain an identification code assigned to the specific microprocessor then utilizing the resource. The method of operation followed by microprocessor 1 involves execution of two bytes of the test and set instruction identified as follows:

Byte 1—this is a test and set operation code.

Byte 2—a processor identification code at a non-zero value. The processor identification code may be any unique integer from 1 to 255. It is established by convention and determined when the instruction is coded.

The first cycle of the clock during which the access technique is to be employed is used as an instruction fetch cycle during which the instruction operation code is read from the memory based on the contents of the instruction address register shown in FIG. 3 to control operation of the microprocessor. This is accomplished by initially gating the instruction address register 10 contents into the storage address register 11 during phase 1, for example, in the center of the phase 1 of a clock timing cycle. The address is a starting location in memory offset by N bytes from any arbitrary starting location M initially set at power on time, say location zero. The address present in the storage address register 11 is presented to the storage unit over the address bus and is used to access the operation code to be employed. At the same time, the instruction address register 10 has its contents gated to an incrementer register 12 and, at phase 2 of the first clock cycle, the incrementing register 12 has its contents gated to the instruction address register 10 thus advancing its contents to the next highest storage location which will contain the microprocessor identification code.

During phase 2 of the first clock cycle, the contents of the storage data register 6 shown in FIG. 1 will be gated to the data in/data out register 20. At this time data register 20 will contain the operation code for the interlock or test and set instruction. At the first phase of the second timing cycle, the contents of the data register 20 will be transferred to the instruction register 21 as shown in FIG. 3. The second timing cycle is used to obtain the processor identification code for the specific processor which is requesting use of a given resource. This is accomplished by gating the contents of the instruction address register 10 to the storage address register 11 to present to the storage unit the address of the processor identification code. At the same time, the instruction address register 10 has its contents gated to the incrementing register 12 to advance to the next instruction count. At phase 2 of this second cycle, the incrementing register 12 will have its contents gated back to the instruction address register 10, thus increasing the instruction count by 1. During the phase 2 of the second timing cycle, the contents of the storage data register 6 or 7 associated with the microprocessor 1 or 2 respectively will be gated to the data register 20 so that it will contain the processor identification code. Also during phase 2 of the second clock cycle, condition codes from a condition code register 24 will be reset to a 0 state.

Only two condition codes will be permitted in the present method and these are identified as codes Z and C in FIG. 3. If the contents of register 24 in portion 30 (the Z content) is set to 1, it is an indication that all zero output has been obtained from the ALU 23 as the result of some logical operation. If the contents of section 31 of register 24 (the C section) is set to 1, it is an indication that the two inputs to the ALU 23 are equal in a comparison. The contents of portion 31 in register 24 is used in a test and set or interlock instruction to designate whether the desired resource is then available for use. Section C in register 24 will be set to a 1 if the resource is available and will be set to 0 if the resource is not available or is presently in use by another processor.

A third clock time cycle is used to obtain a resource control byte for the desired resource to which access is requested so that a test for availability can be made. It is desirable to have many shared resources in order to reduce the investment in the system. The mechanism to accomplish this as noted earlier is via the resource control byte address which may be loaded into the index register 13 prior to execution of this access control method described as a test and set instruction.

At phase 1 of a third clock cycle, the index register 13 contents will be loaded into the storage address register 11 and the address of the resource control byte will be accessed in the storage unit. At the same time the contents of the data register 20 (which will then be the processor identification code) will be transferred to the working register 22 since at phase 2 of the third cycle, the resource control byte resident in the storage data register 6, for example, will be loaded into data register 20.

The fourth cycle of the clock is utilized to determine whether a given identified resource is currently available. The convention adopted is that the resource is determined to be available if the resource control byte contents is 0. Thus, at phase 1 of the fourth clock cycle, the register 20 contents is presented to the ALU 23 and the Z portion of the condition code in register 24 is set as a result of the condition of the resource control byte. During phase 2 of this cycle a test is made on the Z contents of register 24. If the contents are 0, the resource control byte was non-zero and the resource is not available and the instruction is terminated. Unavailability of the resource is designated by the C portion 31 of register 24 having a 0 content.

If register portion 30 of register 24 is a 1, the resource is determined to be currently available and the processor issuing the request via its test and set instruction may attempt to obtain access to the resource. The processor accomplishes this by writing into the resource control byte the identification for the specific processor obtained during phase 2 of cycle 5. A later test is made at cycle 8 to determine whether access to the resource has been granted.

However, in order to avoid contention, additional cycles of the clock 4 are necessary during which other operations take place as follows.

During phase 1 of the fifth clock cycle, the work register 22 contents which contains the specific processor identification code will be transferred to the data in-data out register 20. Index register 13 containing the location of the resource control byte will have its contents loaded into the storage address register 11. During phase 2 of the fifth cycle, the contents of data register 20 will be transferred to storage data register 6 as shown in FIG. 1 for microprocessor 1, for example. The contents of data register 20 are also written in the random access memory 3 at this time.

During clock cycle 6, no operations are performed by processor 1 so that a wait or dummy read cycle is effectively provided to ensure a fixed delay period during which time another processor in the interlaced cycle system may be requesting the same resource and comparing its request against the contents then present in the resource control byte register 24.

Turning to FIG. 4 it may be seen that the time of execution or number of clock cycles required for a given sequence identified as B is always greater than or at least equal to that time required for sequence A. Thus, a proper indication of resource allocation is guaranteed for all processors operating in the interlace mode regardless of their time of incidence into execution of their access instruction. The execution time extension cycle 6 is necessary in order to assure that the B sequence in FIG. 4 will be at least as long as the A sequence in total execution time. The A sequence starts with the reading of the resource control byte during clock cycle 3 and ends with the writing of the processor identification code in clock cycle 5. The B sequence begins with the writing of the processor identification code in clock cycle 5 and ends with the reading of the resource control byte contents in clock cycle 7.

As an example of a complete cycle of operation of the invention, FIG. 4 gives a cycle by cycle description.

The start of the test and set instruction sequence begins at cycle 1 with the reading into the instruction register of the specific operation code defined for the type of instruction involved for the given processor. During phase 1 of the first cycle, the address in memory for the location containing the instruction will be provided. At phase 2 the operation code contained in that location will be read from memory into the data in-data out register and will be gated to the instruction register on the next clock cycle. Also during cycle 1, the instruction address is advanced to the next storage location by incrementing the instruction count.

During cycle 2, the incremented instruction address register value will be used for reading the processor identification code from the next location in memory. This is accomplished during phase 1 by providing the instruction address register value to the memory where the portion containing the processor ID will next be accessed. During phase 2 the processor identification code data byte will be read into the processor data in-data out register.

Cycle 3 will provide the address of the resource control byte section in memory. In the interest of simplicity, the example given here assumes that the resource control byte address has been previously established in the processor index register. By providing for this addressability as part of the test and set instruction, one only extends the total number of clock cycles in the instruction sequence and does not affect the novelty of the instruction itself.

Phase 1 of cycle 3 is used to provide the memory address of the section containing the resource control byte. Phase 2 will clock the resource control byte information from memory into the processor data in-data out register.

Cycle 4 requires no reading or writing from or to memory. However, a test of the previously read resource control byte is performed. During phase 1 of cycle 4 the resource control byte data is passed to the ALU and during phase 2 the Z bit is set according to the resource control byte value. If the control byte value is zero, the Z bit is set to a logic 1; if the control byte is not zero, the Z bit is set to a logic zero. (indicating nonavailability of the resource)

If the resource control byte value tested in cycle 4 is not zero, the resource is not available the next cycle will start a new instruction sequence by gating the contents of the instruction address register to the memory to access the next instruction. A non-zero value for the resource control byte indicates that the resource requested is currently in use by another processor. As will become more apparent, this step resolves contention for the same resource between processors.

When a commonly shared resource is not currently in use, the Z-bit will be 1 and cycle 5 will be used to write the processor identification byte which was obtained in cycle 2 into the resource control byte location in memory. Phase 1 of cycle 5 is used to provide the address of the resource control byte to the memory from the processor index register. Phase 2 of the clock cycle 5 is used to clock the processor identification byte into the memory at the resource control byte address location.

In the example given, the instruction execution cycle 6 is utilized as an execution extension time cycle in which no reading or writing relevant to the resource control byte is performed. This cycle is included to insure that the timing relationship for sequence B is greater than or equal to the sequence A as labeled in FIG. 4. The timing relationship thus established is an essential part of the novelty for the test and set instruction being described here.

The reason for the requirement that the execution time for sequence B be greater than or equal to the execution time for sequence A is that it is necessary to resolve potential contention for the common shared resource which will exist under the situation where the two processors are simultaneously executing their instruction sequences. For example, if a second processor begins its test and set instruction execution on cycle 2, phase 2 during which the first processor is already executing such instruction, contention for the resource will exist. During this particular timing occurrence as stated each of the two processors would be able to check their respective Z bit indications and find a true (1 bit) comparison which would lead to a faulty conditon in which each processor believes that the resource is available and that it has control of the resource whereas the other may actually have obtained it. This occurs since the second reading sequence of the control byte by the first processor will be performed prior to an uninhibited writing phase of the resource control byte by the second processor. The general algorithm involved would allow both processors to have control of the common resource under such circumstances, a result that is totally unacceptable.

Cycle 7 provides the address of the resource control byte section in memory from the index register for the second reading of that control byte. The control byte address is then gated to the memory on phase 1 of cycle 7 and the control byte itself is clocked into the data in-data out register on phase 2. The second reading of the control byte information and the subsequent test cycle provides an undisputed confirmation of control of the common resource since any opportunity for the control byte to be altered by the other processor has been provided and passed.

During cycle 8 the first test of the resource control byte is made against the processor identification written in cycle 5. If the two bytes compare, the condition code bit is set to indicate that the given processor has sole control of the resource. The resource is relinquished by the processor gaining control of it when use is completed and the resource control byte is restored to 0 in a separate operation.

During the seventh cycle of the clock, the resource control byte register contents from memory is again read. During phase 1 of the seventh cycle, the contents of the index register 13 containing the address of the resource control byte is loaded into the storage address register 11 and the random access memory 3 is thereby accessed. The contents of random access memory are then read into the data register 20.

During phase 1 of the seventh clock cycle, the work register 22 will contain the processor identification code and the data register 20 will contain the resource control byte. These are gated to the ALU 23 and at phase one of cycle 8, a compare operation is activated. If the comparison is equal, the condition code for section 31 of register 24 will be set to a 1 to indicate that the resource is available. If the ALU comparison is non-compare, the condition code in section 31 of register 24 will be set to 0 to indicate that the resource is not available. The latter case will occur whenever another processor has been granted access to the resource because of some fortuitous alignment in the timing of its request.

Availability of the resource requested is determined through a conditional branch instruction or operation that follows the test and set instruction and resides in memory based on the contents of register 24 in section 31 condition code. If control of the resource has been obtained, the processor making the request will utilize the resource and when it is finished utilizing the microprocessor will designate completion of its usage by setting the resource control byte back to 0.

The method of operation described for eliminating contention and controlling access to the fixed resource is general and may be applied to systems of processers having more than two processors in the specific case described above. In particular, the method will apply directly whenever n is any even integer and pairs of processors are provided with the phase 1, phase 2 clock pulses defining a clock cycle, each pair being provided with a clock cycle independently of the others and no processor or pair of processors receiving more than one clock cycle before the other processors have each received one clock cycle. Logic means or gates connected between a sequential counter for gating the necessary clock cycles to the pairs of processors can easily be constructed for this function. If there are an odd number of processors in the system, the method also applies as stated for the even number system. However, after cycles have been provided to pairs of processors, a single remaining processor must be provided with a clock cycle individually before the others are supplied with their second or succeeding clock cycles.

In the examples given, the test and set instruction shown would practically limit the system to 255 processors since one byte unique codes for the test and set instructions must be designed and the length of these instructions comprise eight bits which can define at most 256 unique codes for identifying the separate processors.

The machine language instructions for causing the various read and write operations and the loading and unloading of the various registers to and from the various locations are dependent upon the specific type of microprocessor employed. These instructions will be obvious to those skilled in the art of writing microcode instructions for microprocessors. Especially in view of the requirements for execution of the method as shown in FIG. 4 and the embodiment as shown in FIG. 3 for a typical microprocessor, it is unnecessary to provide a comprehensive list of microcode instructions since those of skill in the art can quickly write the necessary sequences to cause the appropriate loading and unloading from and to the various registers as described in these figures.

As an aid to understanding the specific instructions necessary, however, FIG. 4 includes indications of the operations occurring at each phase clock point.

Having thus described my invention with reference to a preferred embodiment, what is desired to be protected by Letters Patent is:

1. In a complementarily phased clock cycle driven multiprocessor system having N independent processors divided into Q groups of two processors per group where N is even and into Q+1 groups including a single group of one processor if N is odd, and said system having a common clocking means for sequentially supplying to said groups of processors a stream of cyclic clock signals, each cycle of said cyclic clock having two phases and each group of processors being provided with one clock cycle in sequence before any said group receives another said clock cycle, and wherein each said processor in a group executes or accesses data in interleaved fashion with the other said processor in said group with one said processor executing on one said phase of said clock cycle while the other said processor accesses data on said phase, and in which said one processor accesses data on said other phase of said clock cycle while said other processor executes data;

and said system further having certain fixed resources to be shared by said processors, said processors contending for the exclusive use thereof; and said system having control means for granting exclusive use of a fixed resource to one or another of said contending processors, said control means including at least a control register for storing data and means for storing in said register indication of the current state of availability of each said fixed resource, an improved method of controlling the allocation of said fixed resources to an individual processor's use, comprising individual steps executed serially by each said processor within said stream of cyclic clock signals of:

accessing the current contents of said control register for said shared resource;

examining the contents of said control register to determine the availability of said resource;

setting the contents of said control register to a unique digital code assigned to the particular said processor contending for usage of said resource upon said processor's next clock cycle if said examining step indicates availability exists for said resource;

waiting for one cycle of said system clock to pass without operations involved in gaining access to control by said processor taking place during which time the other said processor in said group in which said processor is classed may access, examine or set the contents of said control register; and comparing after said waiting step said unique digital code assigned to said particular processor contending for usage of said resource with the existing content of said control register;

acquiring control when using said fixed resource only if a true comparison exists between said processor's unique code and the contents resident in said control register; and setting said control register to indicate current availability of said resource when said processor completes the task for which said resource was utilized.

2. The method as described in claim 1, wherein:

said providing of clocking cycles further comprises supplying each said processor with both a first and a second phase clock pulse in turn to define a clock cycle for said processor, no said processor being supplied with a subsequent said clock cycle of phased clock pulses before every said processor in said system has received at least one said clock cycle.

* * * * *